UNITED STATES PATENT OFFICE.

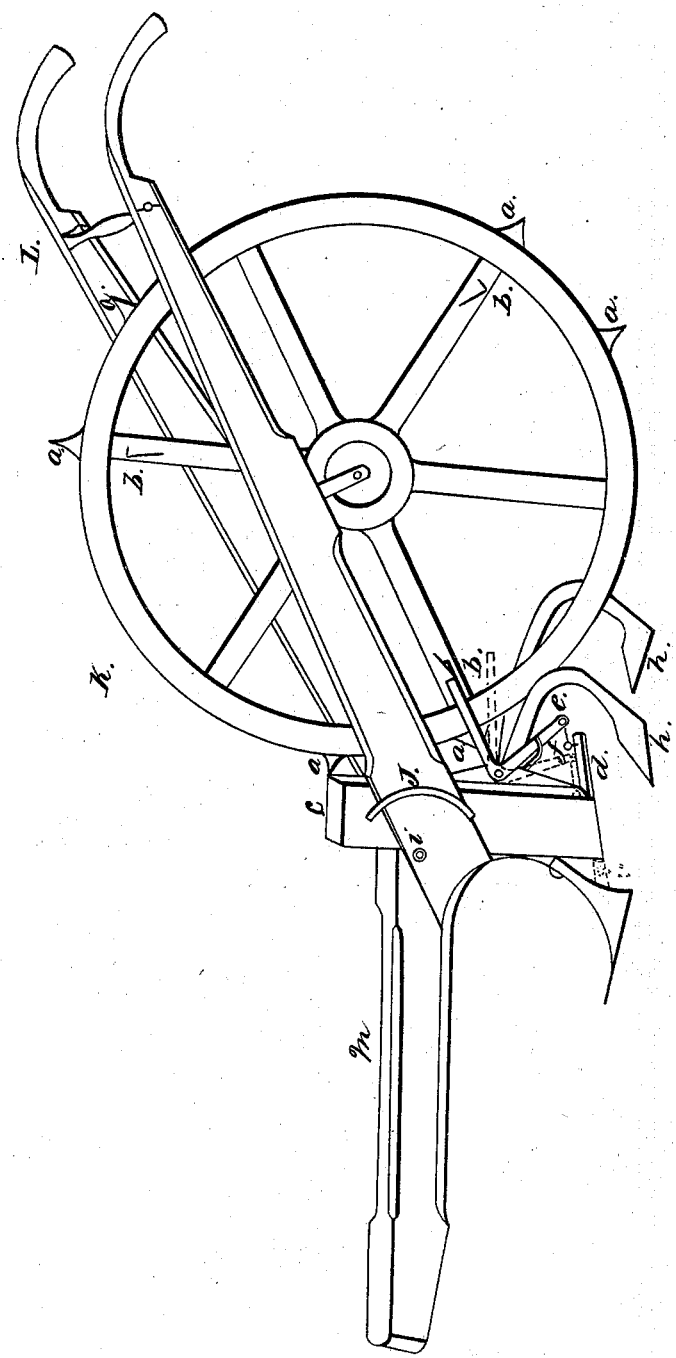

JAMES T. MERCER, OF SENECA TOWNSHIP, MONROE COUNTY, OHIO.

IMPROVEMENT IN SEED-PLANTERS.

Specification forming part of Letters Patent No. 26,605, dated December 27, 1859.

*To all whom it may concern:*

Be it known that I, JAMES T. MERCER, of Seneca township, in the county of Monroe and State of Ohio, have invented a new and useful Corn-Planter or Machine for the Dropping and Covering of Corn in Hills; and I do hereby declare that the following is a full, and exact description of the construction and operation of the same, reference being had to the annexed drawings, making a part of this specification.

I construct a shoveling-plow with beam M and stock, as represented, and to the same is attached a wheel, K, by arms or shafts L, framed together, and which serve likewise for handles L, and are fastened to beam and stock by the bolt or pivot $i$ and stirrup J, thus permitting an up-and-down motion to the wheel, &c., and upon the periphery of the wheel are fixed pyramidal block or hill-markers $a$ $a$, and placed two and two, some ten inches apart and some three and a half feet distant from center between each "two," according to size of wheel; and to each spoke of wheel for every pair of blocks is fixed a pressure-arm, $b$, to force out the discharging-slide $d$ by means of a crooked lever, $e$, and counteracting-spring $f$, $d$ being a common slot with a seed-orifice in the front end, which works in and out of the hopper C behind and under the shovel, the hopper C being an oblong square box with an offset resting upon the beam and extending down beside the stock. $h$ $h$ are small mold-board plows resting upon a several-inch base and level with the base of the shovel, and are attached permanently by crooked shanks of unequal length to stock $m$ and beam $m$, as represented.

My machine being thus constructed, its operation will be readily understood by considering the motion as given to it by the horse or horses. As the plow moves forward and the wheel K revolves the pressure-arms $b$ bear upon the crooked lever $e$, and, pressing the same down as far as dotted lines, push the discharging-slide $d$, with its seed, out of and forward of the hopper C and under the shovel, where the seed falls, while the slide $d$ is jerked back by the spring $f$ so soon as the lever is free from the pressure-arm $b$. The seed or corn thus placed in the furrow made by the shovel is covered by the coverers or plows $h$ $h$, throwing sufficient dirt from the sides of the main furrow, and the exact place the corn is deposited under ground marked externally in the track of the wheel by the swages $a$ $a$, the wheel revolving that part of the same to the ground coequal with the dropping and covering, or as nearly so as possible. The hills thus marked, the corn may be planted in rows each way, as the planter may will.

In the above-described machine I am aware that some common and similar parts are variously used in other machinery. Such I do not claim, of course; but What I do claim as my invention, and desire to secure by Letters Patent, is—

The arrangement of the handles L, beam $m$, pivot $i$, stirrup J, wheel K, arms $b$, lever $e$, slide $d$, hopper C, spring $f$, markers $a$ $a$, and coverers $h$ $h$, the whole being constructed as described, for the purposes set forth.

J. T. MERCER.

Witnesses:
WM. R. MAY,
T. J. ASHLOCK.